United States Patent
Won et al.

(10) Patent No.: US 9,917,462 B2
(45) Date of Patent: Mar. 13, 2018

(54) METHOD AND APPARATUS FOR POWER SHARING

(71) Applicant: Samsung Electronics Co., Ltd., Gyeonggi-do (KR)

(72) Inventors: Chiseon Won, Gyeonggi-do (KR); Yongjun Yu, Gyeonggi-do (KR); Jongkyu Lee, Gyeonggi-do (KR); Siyoul Choi, Gyeonggi-do (KR); Hyunseok Kim, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 287 days.

(21) Appl. No.: 14/621,782

(22) Filed: Feb. 13, 2015

(65) Prior Publication Data

US 2015/0244185 A1    Aug. 27, 2015

(30) Foreign Application Priority Data

Feb. 21, 2014    (KR) .................. 10-2014-0020877

(51) Int. Cl.
*H02J 7/00* (2006.01)
*G06F 1/26* (2006.01)

(52) U.S. Cl.
CPC ............. *H02J 7/007* (2013.01); *G06F 1/266* (2013.01); *H02J 7/008* (2013.01)

(58) Field of Classification Search
CPC .................................................. H02J 7/0054
USPC ................................................... 320/103
See application file for complete search history.

(56) References Cited

U.S. PATENT DOCUMENTS

| | | | |
|---|---|---|---|
| 8,774,995 B2* | 7/2014 | Ishibashi | B60L 11/1809 180/65.1 |
| 2011/0016333 A1* | 1/2011 | Scott | G06F 1/266 713/300 |
| 2012/0019193 A1 | 1/2012 | Yu et al. | |
| 2013/0134923 A1* | 5/2013 | Smith | G06F 1/26 320/103 |

FOREIGN PATENT DOCUMENTS

| KR | 10-0387067 B1 | 5/2003 |
|---|---|---|
| KR | 10-1390402 B1 | 4/2014 |

* cited by examiner

*Primary Examiner* — Edward Tso
*Assistant Examiner* — Ahmed Omar
(74) *Attorney, Agent, or Firm* — Cha + Reiter, LLC

(57) ABSTRACT

A method is provided comprising: detecting an electrical connection between a first device having a first battery and a second device having a second battery; receiving an indication of a residual power of the second battery; displaying, by the first device, a power sharing interface based on the indication of the residual power of the second battery; detecting an input to the interface specifying a threshold amount of power; transmitting power from the first battery to the second device until the threshold amount of power is transmitted.

18 Claims, 9 Drawing Sheets

METHOD AND APPARATUS FOR POWER SHARING

CROSS-REFERENCE TO RELATED APPLICATION

This application claims priority from and the benefit under 35 U.S.C. § 119(a) of Korean Patent Application No. 10-2014-0020877, filed on Feb. 21, 2014, which is hereby incorporated by reference for all purposes as if fully set forth herein.

BACKGROUND

1. Field of the Disclosure

The present disclosure relates generally to electronic devices, and more particularly to a method and apparatus for power sharing.

2. Description of the Prior Art

An electronic device, such as a smart phone or a tablet PC, may be connected with an external device through a cable, for example, a Universal Serial Bus (USB), and supply power of its battery to the external device. The external device charges its battery with the supplied power.

SUMMARY

According to aspects of the disclosure, a method is provided comprising: detecting an electrical connection between a first device having a first battery and a second device having a second battery; receiving an indication of a residual power of the second battery; displaying, by the first device, a power sharing interface based on the indication of the residual power of the second battery; detecting an input to the interface specifying a threshold amount of power; transmitting power from the first battery to the second device until the threshold amount of power is transmitted.

According to aspects of the disclosure, a method is provided comprising: detecting an electrical connection between a first device having a first battery and a second device having a second battery; receiving an indication of a residual power of the second battery; displaying, by the first device, a power sharing interface based on the indication of the residual power of the second battery; detecting an input to the interface specifying a threshold amount of power; receiving power from the second battery until the threshold amount of power is received.

According to aspects of the disclosure, an electronic device is provided comprising a processor configured to: detect an electrical connection between a first device having a first battery and a second device having a second battery; receive an indication of a residual power of the second battery; display, by the first device, a power sharing interface based on the indication of the residual power of the second battery; detect an input to the interface specifying a threshold amount of power; transmit power from the first battery to the second device until the threshold amount of power is transmitted.

According to aspects of the disclosure, an electronic device is provided comprising a processor configured to: detect an electrical connection between a first device having a first battery and a second device having a second battery; receive an indication of a residual power of the second battery; display, by the first device, a power sharing interface based on the indication of the residual power of the second battery; detect an input to the interface specifying a threshold amount of power; receive power from the second battery until the threshold amount of power is received.

BRIEF DESCRIPTION OF THE DRAWINGS

The above features and advantages of the present disclosure will be more apparent from the following detailed description in conjunction with the accompanying drawings, in which.

DETAILED DESCRIPTION

Figure 1:
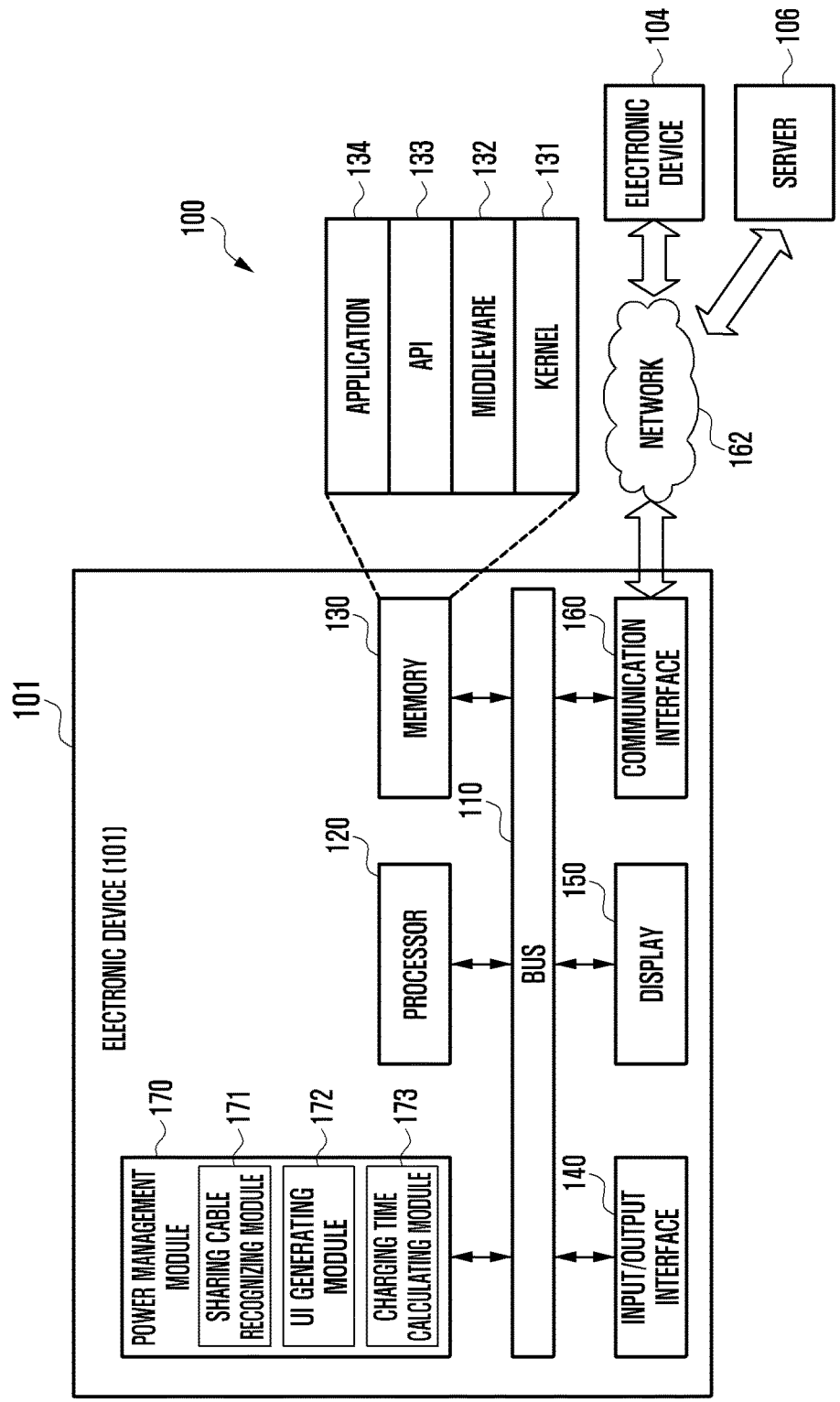
FIG. 1 illustrates an example of a network environment 100 including an electronic device, according to aspects of the disclosure.

Hereinafter, the present disclosure will be described with reference to the accompanying drawings. The present disclosure may have various aspects, and modifications and changes may be made therein. Therefore, the present disclosure will be described in detail with reference to particular examples shown in the accompanying drawings. However, it should be understood that there is no intent to limit the present disclosure to the particular forms, and the present disclosure should be construed to cover all modifications, equivalents, and/or alternatives falling within the spirit and scope of the present disclosure. In describing the drawings, similar elements are designated by similar reference numerals.

As used in the present disclosure, the expression "include" or "may include" refers to the existence of a corresponding function, operation, or constituent element, and does not limit one or more additional functions, operations, or constituent elements. Further, as used in the present disclosure, the term such as "include" or "have" may be construed to denote a certain characteristic, number, step, operation, constituent element, component or a combination thereof, but may not be construed to exclude the existence of or a possibility of addition of one or more other characteristics, numbers, steps, operations, constituent elements, components or combinations thereof.

As used in the present disclosure, the expression "or" includes any or all combinations of words enumerated together. For example, the expression "A or B" may include A, may include B, or may include both A and B.

While expressions including ordinal numbers, such as "first" and "second", as used in the present disclosure may modify various constituent elements, such constituent elements are not limited by the above expressions. For example, the above expressions do not limit the sequence and/or importance of the corresponding constituent elements. The above expressions may be used merely for the purpose of distinguishing a constituent element from other constituent elements. For example, a first user device and a second user device indicate different user devices although both are user devices. For example, a first constituent element may be termed a second constituent element, and likewise a second constituent element may also be termed a first constituent element without departing from the scope of the present disclosure.

When a component is referred to as being "connected" or "accessed" to any other component, it should be understood that the component may be directly connected or otherwise made accessible by the other component, but another new component may also be interposed between them. Contrarily, when a component is referred to as being "directly connected" or "directly accessed" to any other component, it should be understood that there is no new component between the component and the other component.

The terms as used in various parts of the present disclosure are not intended to limit the present disclosure. Singular forms are intended to include plural forms unless the context clearly indicates otherwise.

Unless defined otherwise, all terms used herein, including technical terms and scientific terms, have the same meaning as commonly understood by a person of ordinary skill in the art to which the present disclosure pertains. Such terms as those defined in a generally used dictionary are to be interpreted to have the meanings equal to the contextual meanings in the relevant field of art, and are not to be interpreted to have ideal or excessively formal meanings unless clearly defined in the present disclosure.

An electronic device according to the present disclosure may be a device including a communication function. For example, the electronic device may include at least one of a smartphone, a tablet personal computer (PC), a mobile phone, a video phone, an electronic book (e-book) reader, a desktop PC, a laptop PC, a netbook computer, a personal digital assistant (PDA), a portable multimedia player (PMP), an MP3 player, a mobile medical appliance, a camera, and a wearable device (e.g., a head-mounted-device (HMD) such as electronic glasses, electronic clothes, an electronic bracelet, an electronic necklace, an electronic appcessory, electronic tattoos, or a smartwatch).

According to aspects of the disclosure, the electronic device may be a smart home appliance with a communication function. The smart home appliance as the electronic device, for example, may include at least one of a television, a digital video disk (DVD) player, an audio, a refrigerator, an air conditioner, a vacuum cleaner, an oven, a microwave oven, a washing machine, an air cleaner, a set-top box, a TV box (e.g., Samsung HomeSync™, Apple TV™, or Google TV™), a game console, an electronic dictionary, an electronic key, a camcorder, and an electronic photo frame.

According to aspects of the disclosure, the electronic devices may include at least one of various medical devices (e.g., magnetic resonance angiography (MRA), magnetic resonance imaging (MRI), computed tomography (CT), and ultrasonic machines), navigation equipment, a global positioning system (GPS) receiver, an event data recorder (EDR), a flight data recorder (FDR), an automotive infotainment device, electronic equipment for ships (e.g., ship navigation equipment and a gyrocompass), avionics, security equipment, a vehicle head unit, an industrial or home robot, an automatic teller machine (ATM) of a banking system, and a point of sales (POS) in a shop.

According to aspects of the disclosure, the electronic device may include at least one of a part of furniture or a building/structure, an electronic board, an electronic signature receiving device, a projector, and various kinds of measuring instruments (e.g., a water meter, an electric meter, a gas meter, and a radio wave meter). The electronic device according to the present disclosure may be a combination of one or more of the aforementioned various devices. Further, the electronic device according to the present disclosure may be a flexible device. Further, it will be apparent to those skilled in the art that the electronic device according to the present disclosure is not limited to the aforementioned devices.

Hereinafter, an example of an electronic device will be described with reference to the accompanying drawings. The term "a user" as used throughout the disclosure may refer to any person who uses an electronic device or any other device (e.g., an artificial intelligence electronic device) using an electronic device.

FIG. 1 illustrates an example of a network environment 100 including an electronic device 101, according to aspects of the disclosure. Referring to FIG. 1, the electronic device 101 may include a bus 110, a processor 120, a memory 130, an input/output interface 140, a display 150, a communication interface 160, and an application control module 170.

The bus 110 may be a circuit interconnecting the aforementioned components and transmitting communication (e.g., a control message) between the aforementioned components.

The processor 120 may include any suitable type of processing circuitry, such as a general-purpose processor (e.g., an ARM-based processor), a Field-Programmable Gate Array (FPGA), an Application-Specific Integrated Circuit (ASIC), a Digital Signal Processor (DSP), a Programmable Logic Device (PLD), etc.) The processor 120, for example, may receive instructions from the aforementioned components (e.g., the memory 130, the input/output interface 140, the display 150, the communication interface 160, and the application control module 170) other than the processor 120 through the bus 110, decode the received instructions, and perform operations or data processing according to the decoded instructions.

The memory 130 may store instructions or data received from or generated by the processor 120 or other components (e.g., the input/output interface 140, the display 150, the communication interface 160, and the application control module 170). The memory 130 may include programming modules, for example, a kernel 131, middleware 132, an application programming interface (API) 133, and applications 134. Each of the programming modules as described above may be formed by software, firmware, hardware, or a combination of two or more thereof.

The kernel 131 may control or manage system resources (e.g., the bus 110, the processor 120, and the memory 130) used to execute operations or functions implemented in the remaining other programming modules, for example, the middleware 132, the API 133, and the applications 134. Further, the kernel 131 may provide an interface that allows the middleware 132, the API 133, or the applications 134 to access and control or manage individual components of the electronic device 101.

The middleware 132 may serve to mediate between the API 133 or the applications 134 and the kernel 131, that is, allow the API 133 or the application 134 to communicate and exchange data with the kernel 131. Further, the middleware 132 may perform control (e.g., scheduling or load balancing) for task requests received from the applications 134 by using, for example, a method of assigning a priority for use of the system resource (e.g., the bus 110, the processor 120, or the memory 130) of the electronic device 101 to at least one of the applications 134.

The API 133 is an interface for allowing the applications 134 to control functions provided by the kernel 131 and the middleware 132, and may include at least one interface or function (e.g., instruction) for, for example, file control, window control, image processing, or text control.

According to aspects of the disclosure, the applications 134 may include an SMS/MMS application, an e-mail application, a calendar application, an alarm application, a health care application (e.g., an application for measuring the amount of exercise or blood glucose), and an environmental information application (e.g., an application for providing atmospheric pressure information, humidity information, temperature information, and the like). Additionally or alternatively, the applications 134 may include an application associated with information exchange between the electronic device 101 and an external electronic device (e.g., the electronic device 104). The application associated with information exchange, for example, may include a notification relay application for transferring specific information to the external electronic device or a device management application for managing the external electronic device.

For example, the notification relay application may include a function of transferring notification information, generated in another application of the electronic device 101 (e.g., the SMS/MMS application, the e-mail application, the health care application, or the environmental information application), to an external electronic device (e.g., the electronic device 104). Additionally or alternatively, the notification relay application, for example, may receive notification information from an external electronic device (e.g., the electronic device 104) and provide the received notification information to a user. The device management application, for example, may manage (e.g., install, remove, or update) a function for at least a part of an external electronic device (e.g., the electronic device 104) communicating with the electronic device 101 (e.g., a function of turning on/off an external electronic device itself (or some components thereof) or adjusting the brightness (or resolution) of a display), an application running on the external electronic device, or a service provided in the external electronic device (e.g., a calling or messaging service).

According to aspects of the disclosure, the applications 134 may include an application specified according to the attribute (e.g., type) of an external electronic device (e.g., the electronic device 104). For example, when the external electronic device is an MP3 player, the applications 134 may include an application associated with music playback. Similarly, when the external electronic device is a mobile medical device, the applications 134 may include an application associated with health care. According to aspects of the disclosure, the applications 134 may include at least one of an application assigned to the electronic device 101 and an application received from an external electronic device (e.g., the server 106 or the electronic device 104).

The input/output interface 140, for example, may transfer instructions or data, input from a user through an input/output device (e.g., a sensor, a keyboard, or a touch screen), to the processor 120, the memory 130, the communication interface 160, or the application control module 170 through the bus 110. For example, the input/output interface 140 may provide the processor 120 with data corresponding to a user's touch input through a touch screen. Further, the input/output interface 140 may, for example, receive instructions or data from the processor 120, the memory 130, the communication interface 160, or the application control module 170 through the bus 110 and output the received instructions or data through the input/output device (e.g., a speaker or a display). For example, the input/output interface 140 may output voice data processed by the processor 120 to a user through a speaker.

The display 150 may display various pieces of information (e.g., multimedia data or text data) to a user.

The communication interface 160 may establish communication between the electronic device 101 and an external electronic device (e.g., the electronic device 104 or the server 106). For example, the communication interface 160 may be connected to the network 162 through wireless or wired communication and thereby communicate with the external device. The wireless communication, for example, may include at least one of wireless fidelity (WiFi), Bluetooth (BT), near field communication (NFC), a global positioning system (GPS), and cellular communication (e.g., LTE, LTE-A, CDMA, CDMA, UMTS, WiBro, or GSM). The wired communication, for example, may include at least one of a universal serial bus (USB), a high definition multimedia interface (HDMI), recommended standard 232 (RS-232), and a plain old telephone service (POTS).

According to aspects of the disclosure, the network 162 may be a telecommunications network. The telecommunications network may include at least one of a computer network, the Internet, the Internet of things, and a telephone network. According to aspects of the disclosure, a protocol (e.g., a transport layer protocol, a data link layer protocol, or a physical layer protocol) for communication between the electronic device 101 and an external device may be supported by at least one of the applications 134, the application programming interface 133, the middleware 132, the kernel 131, and the communication interface 160.

A power management module 170 may process at least some pieces of information acquired from other elements (e.g., a processor 120, a memory 130, an input/output interface 140, and a communication interface 160), and may provide the processed information to a user by various methods. FIG. 1 illustrates that the power management module 170 is a separate element from the processor 120, but according to aspects of the disclosure, the processor 120 may include the entirety or a part of the power management module 170.

The power management module 170 may recognize a connection between an electronic device 101 and an external device, and execute an "Application for sharing power with an external device" based on battery information about the external device and on battery information about the electronic device 101. The power management module 170 may supply power of a battery of the electronic device 101 to the external device according to the execution of the application. Otherwise, the power management module 170 may receive power from the external device according to the execution of the application, and charge the battery of the electronic device 101 with the received power.

The power management module 170 may include a sharing cable recognizing module 171, a User Interface (UI) generating module 172, and a charging time calculating module 173.

When a cable is connected to a communication interface 162 (for example, a USB terminal), the sharing cable recognizing module 171 may acquire identification information (for example, a resistance value) about the corresponding cable from the connected cable. The sharing cable recognizing module 171 may determine whether the acquired identification information indicates a power sharing cable. When the acquired identification information indicates the power sharing cable, the sharing cable recognizing module 171 may execute the application for sharing power with an external device. When the application (for example, the application for making the power management module 170 be operated as the UI generating module 172 and the charging time calculating module 173) is not installed in the electronic device 101, the sharing cable recognizing module 171 may download the corresponding application by accessing an online market server through the communication interface 160, and install the downloaded application in the memory 130. The sharing cable recognizing module 171 may make an inquiry about whether the application is installed to a user through a display 150. As a result of the inquiry, when the user permits the installation of the application, the sharing cable recognizing module 171 may install the application in the memory 130.

When the electronic device 101 is connected with the external device through the power sharing cable, the UI generating module 172 may transmit a request message for requesting the battery information to the external device through the communication interface 160 (for example, Bluetooth (BT), Wi-Fi, and Near Field Communication (NFC)). The UI generating module 172 may receive a response message through the communication interface 160. The response message may include the battery information. For example, the battery information may include a capacity of the battery (for example, mAh), the residual capacity (for example, % and volt (V)) of the battery, and battery usage, and the like. The battery usage may include, for example, battery use rate information for each of system resources (for example, Wi-Fi, a display, and a CPU) of the external device. In addition, the response message may include information about a specification of the external device, a model name of the external device, memory use status information, or the like. The UI generating module 172 may collect the battery information) for example, the capacitance of the battery and the residual capacitance of the battery) about the electronic device 101 from other elements (for example, the processor 120 and the memory 130). The UI generating module 172 may generate the UI by using the collected battery information and the information received from the external device. The UI generating module 172 may display the generated UI through the display 150.

The charging time calculating module 173 may receive information on the charging capacity (for example, 10% of the residual capacitance of the battery of the electronic device 101) set by the user from an input/output interface 140 (for example, a touch screen). The charging time calculating module 173 may calculate a time for charging the battery of the external device based on the information on the set charging capacity, the battery information about the electronic device 101, and the battery information about the external device. The charging time calculating module 173 may display the calculated charging time through the display 150. In addition, the charging time calculating module 173 may receive information about a charging target device set by the user from the input/output interface 140. The charging time calculating module 173 may determine a charging target device based on the received information about the charging target device.

Figure 2:
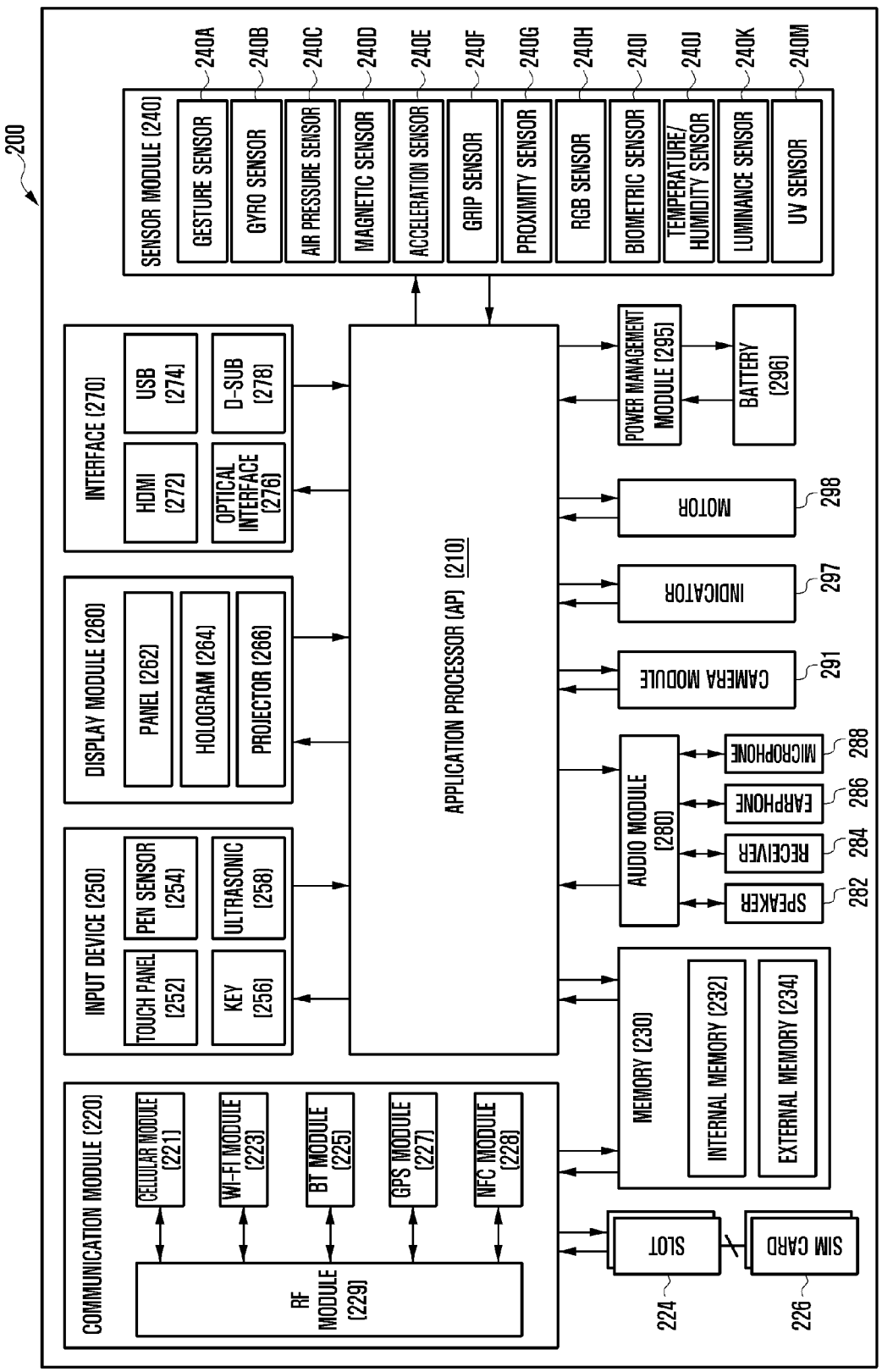
FIG. 2 illustrates a block diagram of an example of an electronic device, according to aspects of the disclosure.

FIG. 2 illustrates a block diagram of an example of an electronic device, according to aspects of the disclosure. The electronic device 200, for example, may constitute all or a part of the electronic device 101 shown in FIG. 1. Referring to FIG. 2, the electronic device 200 may include at least one application processor (AP) 210, a communication module 220, at least one subscriber identity module (SIM) card slot 224, a memory 230, a sensor module 240, an input module 250, a display 260, an interface 270, an audio module 280, a camera module 291, a power management module 295, a battery 296, an indicator 297, and a motor 298.

The AP 210 may drive an operating system or an application program to control a plurality of hardware or software components connected to the AP 210, and may perform processing and operations of various data including multimedia data. The AP 210, for example, may be implemented as a system on chip (SoC). According to aspects of the disclosure, the AP 210 may further include a graphic processing unit (GPU) (not shown).

The communication module 220 (e.g., the communication interface 160) may perform data transmission/reception in communication with other electronic devices (e.g., the electronic device 104 and the server 106) connected to the electronic device 200 (e.g., the electronic device 101) through a network. According to aspects of the disclosure, the communication module 220 may include a cellular module 221, a WiFi module 223, a BT module 222, a GPS module 227, an NFC module 228, and a radio frequency (RF) module 229.

The cellular module 221 may provide a voice call, a video call, an SMS service, an Internet service, and the like through a communication network (e.g., LTE, LTE-A, CDMA, WCDMA, UMTS, or GSM). Also, the cellular module 221 may identify and authenticate an electronic device in a communication network by using, for example, a subscriber identification module (e.g., the SIM card). According to aspects of the disclosure, the cellular module 221 may perform at least some of the functions that may be provided by the AP 210. For example, the cellular module 221 may perform at least a multimedia control function.

According to aspects of the disclosure, the cellular module 221 may include a communication processor (CP). Further, the cellular module 221, for example, may be implemented as a SoC. Although the cellular module 221 (e.g., a CP), the memory 230, the power management module 295, and the like are shown as separate elements from the AP 210 in FIG. 2, the AP 210 may be implemented to include at least some (e.g., the cellular module 221) of the aforementioned elements according to aspects of the disclosure.

According to aspects of the disclosure, the AP 210 or the cellular module 221 (e.g., a CP) may load a command or data received from at least one of a non-volatile memory and other elements connected thereto into a volatile memory and process the loaded command or data. Further, the AP 210 or the cellular module 221 may store data received from or generated by at least one of other elements in a non-volatile memory.

Each of the WiFi module 223, the BT module 222, the GPS module 227, and the NFC module 228, for example, may include a processor for processing data transmitted or received through the corresponding module. Although the cellular module 221, the WiFi module 223, the BT module 222, the GPS module 227, and the NFC module 228 are shown as separate blocks in FIG. 2, at least some (e.g., two or more) of the cellular module 221, the WiFi module 223, the BT module 222, the GPS module 227, and the NFC module 228 may be included in one integrated chip (IC) or one IC package according to aspects of the disclosure. For example, at least some of processors corresponding to the cellular module 221, the WiFi module 223, the BT module 222, the GPS module 227, and the NFC module 228 respectively (e.g., a CP corresponding to the cellular module 221 and a WiFi processor corresponding to the WiFi module 223) may be implemented as one SoC.

The RF module 229 may perform data transmission/reception, for example, RF signal transmission/reception. Although not shown in the drawing, the RF module 229, for example, may include a transceiver, a power amp module (PAM), a frequency filter, a low noise amplifier (LNA), and the like. Also, the RF module 229 may further include a component for transmitting/receiving an electromagnetic wave over the air in wireless communication, such as a conductor or a conducting wire. Although FIG. 2 shows that the cellular module 221, the WiFi module 223, the BT module 222, the GPS module 227, and the NFC module 228 share one RF module 229, at least one of the cellular module 221, the WiFi module 223, the BT module 222, the GPS module 227, and the NFC module 228 may perform RF signal transmission/reception through a separate RF module according to aspects of the disclosure.

At least one SIM card 226 may be a card including a subscriber identification module, and may be inserted into the at least one slot 224 formed in a certain position of the electronic device. The at least one SIM card 226 may include unique identification information (e.g., integrated circuit card identifier (ICCID)) or subscriber information (e.g., international mobile subscriber identity (IMSI)).

The memory 230 (e.g., the memory 130) may include an internal memory 232 or an external memory 234. The internal memory 232, for example, may include at least one of a volatile memory (e.g., a dynamic RAM (DRAM), a static RAM (SRAM), or a synchronous dynamic RAM (SDRAM)) and a non-volatile memory (e.g., a one-time programmable ROM (OTPROM), a programmable ROM (PROM), an erasable and programmable ROM (EPROM), an electrically erasable and programmable ROM (EEPROM), a mask ROM, a flash ROM, a NAND flash memory, or an NOR flash memory).

According to aspects of the disclosure, the internal memory 232 may be a solid state drive (SSD). The external memory 234 may further include a flash drive, for example, a compact flash (CF), a secure digital (SD), a micro secure digital (Micro-SD), a mini secure digital (Mini-SD), an extreme digital (xD), or a memory stick. The external memory 234 may be functionally connected to the electronic device 200 through various interfaces. According to aspects of the disclosure, the electronic device 200 may further include a storage device (or storage medium) such as a hard drive.

The sensor module 240 may measure a physical quantity or detect an operation state of the electronic device 200 and convert the measured or detected information into an electronic signal. The sensor module 240, for example, may include at least one of a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., a red, green and blue (RGB) sensor), a biometric sensor 240I, a temperature/humidity sensor 240J, a light sensor 240K, and a ultraviolet (UV) sensor 240M. Additionally or alternatively, the sensor module 240, for example, may include an E-nose sensor (not shown), an electromyography (EMG) sensor (not shown), an electroencephalogram (EEG) sensor (not shown), an electrocardiogram (ECG) sensor (not shown), an infrared (IR) sensor (not shown), an iris scanner (not shown), and/or a fingerprint sensor (not shown). The sensor module 240 may further include a control circuit for controlling one or more sensors included therein.

The input module 250 may include a touch panel 252, a (digital) pen sensor 254, a key 256, or an ultrasonic input unit 258. The touch panel 252 that recognizes a touch input, for example, may include at least one of a capacitive touch panel, a resistive touch panel, an infrared touch panel, and an acoustic wave touch panel. Also, the touch panel 252 may further include a control circuit. When the touch panel is a capacitive touch panel, it may recognize a physical contact or proximity. The touch panel 252 may also further include a tactile layer. In this case, the touch panel 252 may provide a tactile response to a user.

The (digital) pen sensor 254, for example, may be implemented using a means identical or similar to a means for receiving a touch input from a user or using a separate recognition sheet. The key 256, for example, may include a physical button, an optical key, or a keypad. The ultrasonic input unit 258 is a unit that can identify data by generating an ultrasonic signal through an input tool and detecting a sonic wave through a microphone (e.g., the microphone 688) in the electronic device 600, and is capable of wireless recognition. According to aspects of the disclosure, the electronic device 200 may also receive a user input from an external device (e.g., computer or server) connected thereto by using the communication module 220.

The display 260 (e.g., the display 150) may include a panel 262, a hologram unit 264, or a projector 266. The panel 262, for example, may be a liquid crystal display (LCD) or an active matrix-organic light emitting diode (AM-OLED). The panel 262, for example, may be implemented to be flexible, transparent, or wearable. The panel 262 may also be incorporated into one module together with the touch panel 252. The hologram unit 264 may show a stereoscopic image in the air by using light interference. The projector 266 may display an image by projecting light onto a screen. The screen, for example, may be located inside or outside of the electronic device 200. According to aspects of the disclosure, the display 260 may further include a control circuit for controlling the panel 262, the hologram unit 264, or the projector 266.

The interface 270, for example, may include a high-definition multimedia interface (HDMI) 272, a universal serial bus (USB) 274, an optical interface 276, or a D-sub-miniature (D-sub) 278. The interface 270, for example, may be included in the communication interface 160 shown in FIG. 1. Additionally or alternatively, the interface 290, for example, may include a mobile high-definition link (MHL) interface, a secure digital (SD) card/multimedia card (MMC) interface, or an infrared data association (IrDA) interface.

The audio module 280 may provide bidirectional conversion between a sound and an electronic signal. At least some elements of the audio module 280, for example, may be included in the input/output interface 140 shown in FIG. 1. The audio module 280, for example, may process sound information input or output through a speaker 282, a receiver 284, earphones 286, or the microphone 288.

The camera module 291 is a device that can take both still and moving images, and according to aspects of the disclosure, may include one or more image sensors (e.g., a front sensor or a rear sensor, not shown), a lens (not shown), an image signal processor (ISP) (not shown), or a flash (e.g., an LED or xenon lamp, not shown).

The power management module 295 may manage power of the electronic device 200. Although not shown, the power management module 295, for example, may include a power management integrated circuit (PMIC), a charger IC, or a battery or fuel gauge. Additionally, the power management module 295 may include the power management module 170.

The PMIC, for example, may be mounted in an IC or a SoC semiconductor. Charging methods may be classified into wired charging and wireless charging. The charger IC may charge a battery, and may prevent an overvoltage or excess current from being induced or flowing from a charger. According to aspects of the disclosure, the charger IC may include a charger IC for at least one of the wired charging and the wireless charging. Examples of the wireless charging include magnetic resonance charging, magnetic induction charging, and electromagnetic charging, and an additional circuit such as a coil loop, a resonance circuit, and a rectifier may be added for the wireless charging. The battery gauge, for example, may measure the residual capacity, charge in voltage, current, or temperature of the battery 296. The battery 296 may store or generate electricity, and may supply power to the electronic device 200 by using the stored or generated electricity. The battery 296, for example, may include a rechargeable battery or a solar battery.

The indicator 297 may display a specific status of the electronic device 200 or a part thereof (e.g., the AP 210), for example, a boot-up status, a message status, or a charging status. The motor 298 may convert an electrical signal into a mechanical vibration. Although not shown, the electronic device 200 may include a processing unit (e.g., GPU) for supporting a mobile TV. The processing unit for supporting a mobile TV may process media data pursuant to a certain standard, for example, digital multimedia broadcasting (DMB), digital video broadcasting (DVB), or media flow.

Each of the above-described elements of the electronic device according to the present disclosure may be formed by one or more components, and the names of the corresponding elements may vary according to the type of the electronic device. The electronic device according to the present disclosure may include at least one of the above-described elements, and may exclude some of the elements or further include other additional elements. Further, some of the elements of the electronic device according to the present disclosure may be coupled to form a single entity while performing the same functions as those of the corresponding elements before the coupling.

Figure 3:
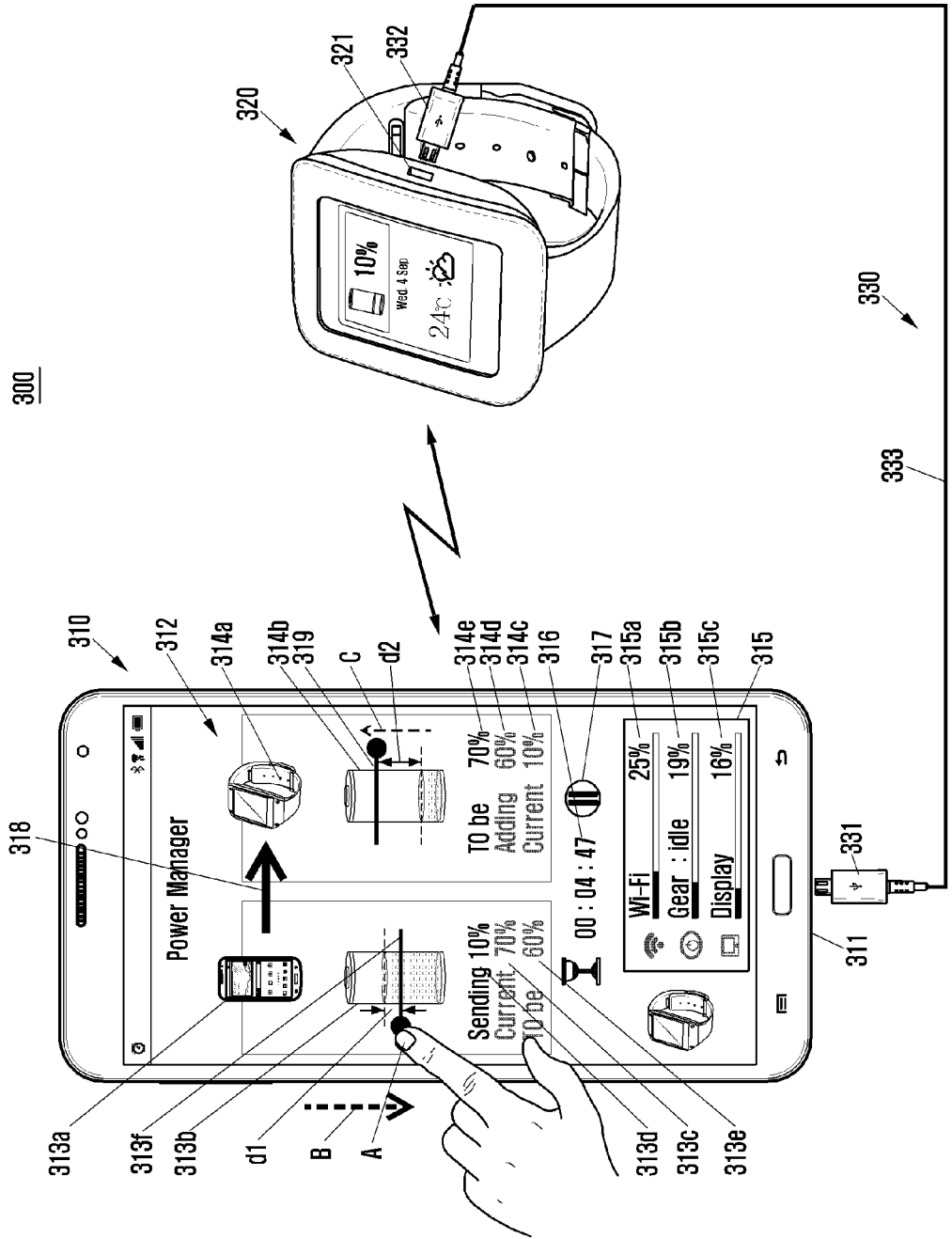
FIG. 3 is a diagram of an example of a unidirectional power sharing system, according to aspects of the disclosure.

FIG. 3 is a diagram of an example of a unidirectional power sharing system 300, according to aspects of the disclosure.

Referring to FIG. 3, the unidirectional power sharing system 300 may include a first electronic device 310, a second electronic device 320, and a power sharing cable 330.

The first electronic device 310 may be a smart phone as illustrated in FIG. 3. The second electronic device 320 may be a smart watch as illustrated in FIG. 3. Although in this example the first electronic device 310 is a smart phone and the second electronic device is a smart watch, it will be understood that the first electronic device 310 and/or the second electronic device 320 may include any suitable type of electronic device, including, but not limited to, the devices discussed above.

The power sharing cable 330 may include a first connector 331 for connecting the first electronic device 310, a second connector 332 for connecting the second electronic device 320, and a power supply line, of which both ends are connected to the connectors 331 and 332, respectively, to transmit power of the first electronic device 310 to the second electronic device 320. The first connector 331 may include an element (for example, a resistor) for identifying the power sharing cable 330.

A method of supplying power from the first electronic device 310 to the second electronic device 320 in the power sharing system 300 will be described below.

An identifier (for example, "power transmission" or a sign or a character for indicating the same) for indicating that the first connector 331 is a power transmitting terminal may be indicated (for example, printed or labeled) on an external surface of the first connector 331. The user may connect the first connector 331 to a connection terminal (not shown) positioned at a lower end 311 of the first electronic device 310 by confirming the identifier. Further, the user may connect the second connector 332 to a connection terminal 321 positioned on a lateral surface of the second electronic device 320. Then, an interface of the first electronic device 310 reads the identification information about the power sharing cable 330 and transmits the read identification information to a processor of the first electronic device 310.

The processor of the first electronic device 310 receives the identification information, and recognizes that the corresponding cable is a power sharing cable based on the received identification information. In response to detecting that the connected cable is a power sharing cable, the processor of the first electronic device 310 may automatically execute (or launch) an application for sharing power. According to the execution of the application, the processor of the first electronic device 310 is connected with the second electronic device 320 by controlling the communication module (for example, a BT module 225, a Wi-Fi module 223, or an NFC module 228). When the connection with the second electronic device 320 is established, the processor of the first electronic device 310 transmits to the second electronic device 320 a message requesting battery information of the second electronic device 320.

A processor of the second electronic device 320 receives the request message and acquires the battery information in response to the request. In addition, the processor of the second electronic device 320 may also acquire another type of information from the memory. The processor of the second electronic device 320 then transmits a response message including the battery information and/or other acquired information to the first electronic device 310. Afterwards, the processor of the first electronic device 310 generates power management information 312 and displays the power management information 312 on a display module.

As illustrated, the power management information 312 may include an image 313a identifying the first electronic device 310, an image 313b indicating the current residual capacity of the battery of the first electronic device 310, and a ratio 313c (for example, %) indicating the current residual capacity with respect to the battery capacity of the first electronic device 310. Further, the display module of the first electronic device 310 displays an image 314a identifying the second electronic device 320, an image 314b indicating the current residual capacity of the battery of the second electronic device 320, and a ratio 314c (for example, %) indicating the current residual capacity with respect to the battery capacity of the second electronic device 320.

In addition, the display module of the first electronic device 310 may display battery use rate information 315. For example, the battery use rate information 315 may include information 315a indicating a rate at which the Wi-Fi module of the second electronic device 320 drains the battery, information 315b indicating a rate at which the system (for example, the processor) of the second electronic device 320 uses the battery, and information 315*c* indicating a rate at which the display module of the second electronic device 320 uses the battery.

When the user touches the image 313*b* or a part (a part within a determined radius from the image 313*b*) adjacent to the image 313*b* with a finger A, the touch panel of the first electronic device 310 recognizes the touch, and transmits corresponding touch input information to the processor. The processor of the first electronic device 310 then displays a slider 313*f* on the display module in response to the touch.

The touch panel of the first electronic device 310 may recognize a touch movement input, and transmits corresponding touch input information to the processor. Here, the touch movement input may include, for example, a gesture moving in a downward direction in the state where the finger A touches a screen (that is, a user input for setting the amount of battery power to be transmitted to the second electronic device 320).

The processor of the first electronic device 310 may then move the slider 313*f* in the downward direction along with finger A, thereby giving the impression that the slider 313*f* is being dragged. Further, the processor calculates a distance d1 of the movement of the slider 313*f* (or receives information corresponding to the distance d1 from the touch panel), and sets the charging capacity based on the calculated distance d1 (or the received information). In this example, the term "charging capacity" refers to the amount of battery power that is to be transmitted from the first electronic device 310 to the second electronic device 320. Further, the processor calculates a ratio 313*d* indicating a transmission capacity with respect to the battery capacity of the first electronic device 310 and a ratio 313*e* indicating a decreased capacity (e.g., the difference of the current residual capacity of the battery of the first electronic device 310 and the transmission capacity) with respect to the battery capacity of the first electronic device 310, and controls the display module so that the display module displays the ratios 313*d* and 313*e*. Further, the processor calculates a ratio 314*d* indicating a transmission capacity with respect to the battery capacity of the second electronic device 320 and a ratio 314*e* indicating an increased capacity (e.g., the sum of the current residual capacity of the battery of the second electronic device 320 and the transmission capacity) with respect to the battery capacity of the second electronic device 320, and controls the display module so that the display module displays the ratios 314*d* and 314*e*.

In some implementations, the processor of the first electronic device 310 may calculate and display a charging time 316. The charging time 316 may be the time it would take the second electronic device 320 to reach the ratio 314*e*. In some implementations, the charging time 316 may be calculated based on battery information (e.g., battery capacity) of the second electronic device 320.

In some implementations, the processor of the first electronic device 310 may display a charging start and a stop button 317. When the button 317 is selected, the processor of the first electronic device 310 performs a charging operation of transmitting the power of the battery of the first electronic device 310 to the second electronic device 320 through the USB module of the first electronic device 310 and the power sharing cable 330. Further, the processor may change the appearance of the button 317 to indicate the state of the charging. For example, while the battery of the second electronic device 320 is being charged, the button 317 may include the symbol "▷" indicating that the charging is currently "on."

In some implementations, the processor of the first electronic device 310 may display a charging progress status (power transmission status) in real-time. For example, the processor of the first electronic device 310 may decrement the charging time 316 as the battery of the second electronic device 320 is being charged. Further, the processor of the first electronic device 310 may update the images 313*b* and 313*c* in real-time to indicate any changes in the available charge in the battery of the electronic device 310. Similarly, the processor of the second electronic device 320 may update the images 314*b* and 314*c* in real-time to indicate any changes in the available charge in the battery of the electronic device 320.

In some implementations, the processor of the first electronic device 310 may stop the charging operation when the charging time 316 expires without measuring the residual capacity of the battery of the first electronic device. Additionally or alternately, the processor of the first electronic device 310 may check the residual capacity of the battery of the first electronic device 310, and when the checked residual capacity of the battery reaches a predetermined (that is, when power corresponding to the predetermined transmission capacity is completely transmitted to the second electronic device 320), the processor of the first electronic device 310 may stop the charging operation.

In some implementations, when the button 317 is selected by the user again during the performance of the charging operation, the processor of the first electronic device 310 may stop (or pause) the charging operation. Further, the processor may change the appearance of the button to indicate that the charging is stopped. For example, the processor may remove the symbol "▷" from display and replace it with the "∥" symbol, as shown in FIG. 3.".

In some implementations, the processor of the first electronic device 310 may display an indication that the first electronic device 310 is a power supplier and the second electronic device 320 is a power receiver. For example, the indication may include an arrow 318 heading from the image 313*a* to the image 314*a*. In some instances, the first electronic device 310 may display the arrow 318 while the charging operation is being performed, and may hide the arrow 318 when the charging operation is stopped (or paused). Alternately, the display module of the first electronic device 310 may make the arrow 318 flicker while the charging operation is being performed, and may continuously display the arrow 318 (e.g., display the arrow 318 in a steady state) when the charging operation is stopped.

In some implementations, when the user touches the image 314*b* or the adjacent part (for example, the part within the predetermined radius from the image 314*b* with a finger (or a touch input means such as a pen), the processor of the first electronic device 310 displays the slider 319 on the image 314*b*. The processor of the first electronic device 310 controls the display module so that the slider 319 is moved in upward direction in response to a movement of the finger in the up direction C. Further, the processor may calculate the distance d2 by which the slider 319 moves (or receives the information corresponding to the distance d2 from the touch panel), and calculate the charging capacity based on the distance d2.

In some implementations, data communication between the first electronic device 310 and the second electronic device 320 may also be performed by wired communication, not the short range wireless communication (for example, BT). For example, the power sharing cable 330 may further include a data line for data communication between the first electronic device 310 and the second electronic device 320, as well as the power supply line 333.

Figure 4:
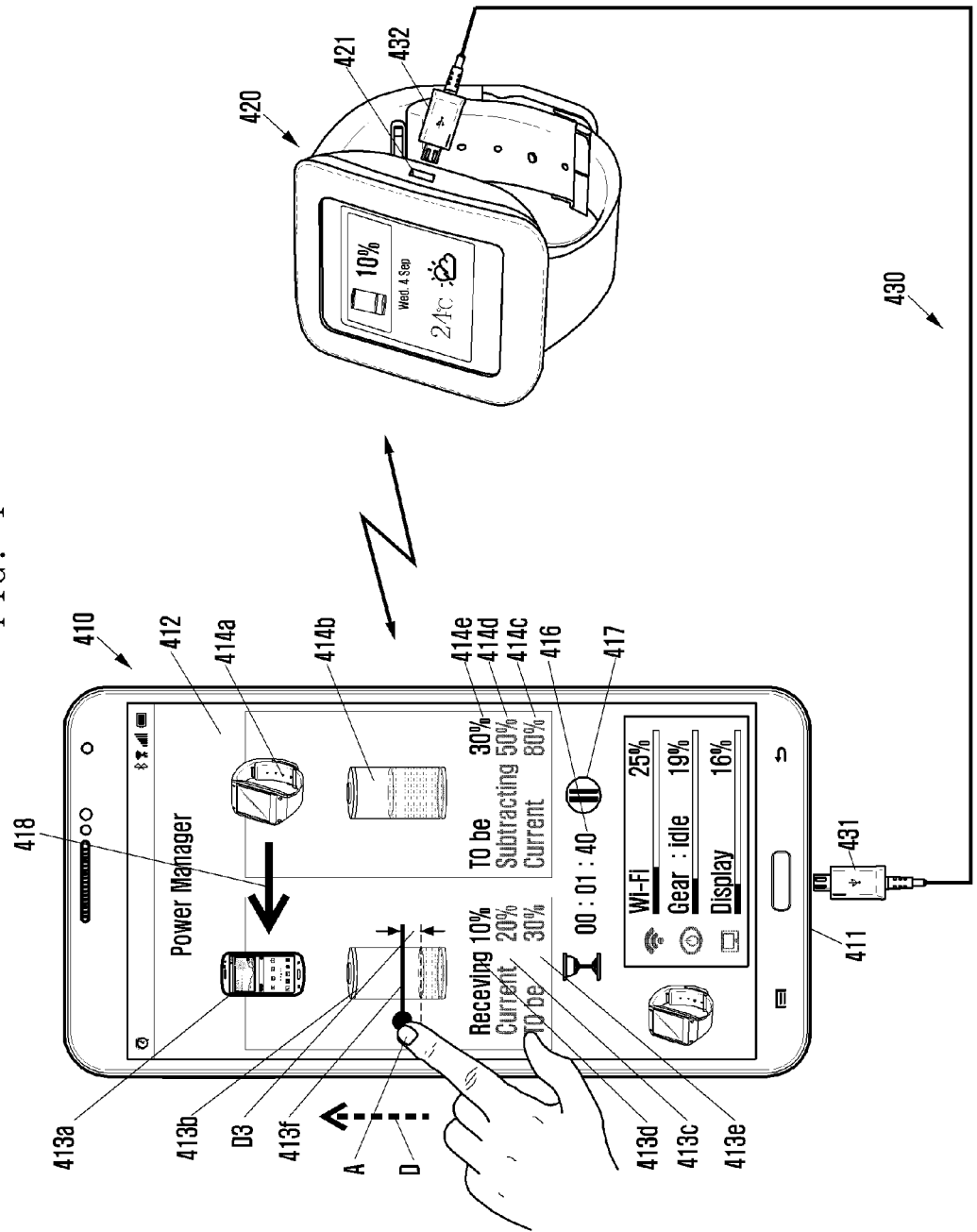
FIG. 4 is a diagram of an example of a bidirectional power sharing system, according to aspects of the disclosure.

FIG. 4 is a diagram of an example of a bidirectional power sharing system 400, according to aspects of the disclosure.

Referring to FIG. 4, the bidirectional power sharing system 400 may include a first electronic device 410, a second electronic device 420, and a power sharing cable 430. The devices 410, 420, and the cable 430 may have the same configurations as the devices 310 and 320, and the cable 330, respectively. However, in the example of FIG. 4, the first electronic device 410 may receive power from the second electronic device 420, instead.

In some implementations, a user may connect a first connector 431 to a connection terminal (not shown) positioned at a lower end 411 of the first electronic device 410. Further, the user may connect a second connector 432 to a connection terminal 421 positioned on a lateral surface of the second electronic device 420. Then, an interface of the first electronic device 410 reads identification information about the power sharing cable 430 and transmits the read identification information to a processor of the first electronic device 410. Afterwards, the processor of the first electronic device 410 may generate and display power management information 412.

As illustrated, the power management information 412, may include an image 413*a* identifying the first electronic device 410, an image 413*b* indicating a current residual capacity of the battery of the first electronic device 410, and a ratio 413*c* indicating the ratio between the current residual capacity and the total battery capacity of the first electronic device 410. Further, the first electronic device 410 may display an image 414*a* identifying the second electronic device 420, an image 414*b* indicating a current residual capacity of a battery of the second electronic device 420, and a ratio 414*c* indicating the ratio between the current residual capacity and the total battery capacity of the second electronic device 420.

When the user touches the image 413*b* or a part adjacent to the image 413*b* with a finger A, a touch panel of the first electronic device 410 recognizes the touch, and transmits corresponding touch input information to the processor. The processor of the first electronic device 410 displays a (previously-hidden) slider 413*f* as in response.

The processor of the first electronic device 410 controls the display module so that the slider 413*f* moves in an up direction and is displayed in response to the movement of the finger A in the up direction D (that is, a touch movement input for setting the amount of battery power to be received from the second electronic device 420). Further, the processor calculates a distance d3 of the movement of the slider 413*f* (or receives information corresponding to the distance d3 from the touch panel), and sets a charging capacity based on the calculated distance d3 (or the received information). For example, the charging capacity means the amount of battery power (that is, a reception capacity) to be received from the second electronic device 420. Further, the processor calculates a ratio 413*d* indicating a reception capacity with respect to the battery capacity of the first electronic device 410 and a ratio 413*e* indicating "an increase capacity (e.g., the sum of the current residual capacity of the battery of the first electronic device 410 and the reception capacity)" with respect to the battery capacity of the first electronic device 410, and controls the display module so that the display module displays the ratios 413*d* and 413*e*. Further, the processor of the first electronic device 410 calculates a ratio 414*d* indicating a reception capacity with respect to the battery capacity of the second electronic device 420 and a ratio 414*e* indicating "a decrease capacity (e.g., the difference between the current residual capacity of the battery of the second electronic device 420 and the reception capacity)" with respect to the battery capacity of the second electronic device 420, and controls the display module so that the display module displays the ratios 414*d* and 414*e*.

In some implementations, the processor of the first electronic device 410 may calculate and display a charging time 416. The charging time 416 may be the time it would take the first electronic device to reach the ratio 413*e*. The charging time may be calculated based on battery information (e.g., battery capacity) of the second electronic device 420.

In some implementations, the processor of the first electronic device 410 may display a charging start and a stop button 417. When the button 417 is selected by the user, the processor of the first electronic device 410 controls a BT module, and transmits a message requesting power transmission to the second electronic device 420. The second electronic device 420 transmits the power of its battery to the first electronic device 410 through its USB module and the power sharing cable 430 in response to the request for power transmission. The first electronic device 410 may receive power from the battery of the second electronic device 420 through the power sharing cable 430, and use this power to charge its own battery. The processor of the first electronic device 410 may change the appearance of the button 417 to include the symbol "▷" while the battery of the first electronic device 410 is being charged.

In some implementations, the processor of the first electronic device 410 may display a charging progress status (power reception status) in real-time. For example, the processor of the first electronic device 410 may decrement the charging time 416 as the battery of the first electronic device 410 is being charged. Further, the processor may update the images 414*b* and 414*c* to indicate the residual capacity of the battery of the first electronic device 410 is increased. Further, the processor may control the display module so that the display module displays a status, in which the residual capacity of the battery of the second electronic device 420 is decreased through the images 414*b* and 414*c* in real-time.

In some implementations, the processor of the first electronic device 410 may stop charging the battery of the first electronic device when the residual capacity of the battery reaches the predetermined increase capacity. For example, the processor of the first electronic device 410 may transmit to the second electronic device 420 a message requesting the second electronic device to stop transmitting power to the first electronic device 410. Afterwards, the second electronic device 420 may stop the power transmission in response to the request.

In some implementations, when the user selects the button 417 while the charging operation is being performed, the processor of the first electronic device 410 may stop (or pause) the charging operation. For example, the processor of the first electronic device 410 may transmit (e.g., via Bluetooth) to the second electronic device 420 a message requesting the second electronic device 420 to stop transmitting power to the first electronic device 410. The second electronic device 420 may then stop the power transmission in response to the message. Further, the processor of the first electronic device 410 may change the appearance of the button 471 to include a "∎∎" symbol instead of the "▷" symbol.

In some implementations, the processor of the first electronic device 410 may control the display module so that the display module displays an indicator indicating that the first electronic device 410 is a power receiver and the second electronic device 420 is a power supplier, for example, "an arrow 418 heading from the image 414*a* to the image 413*a*".

Figure 5:
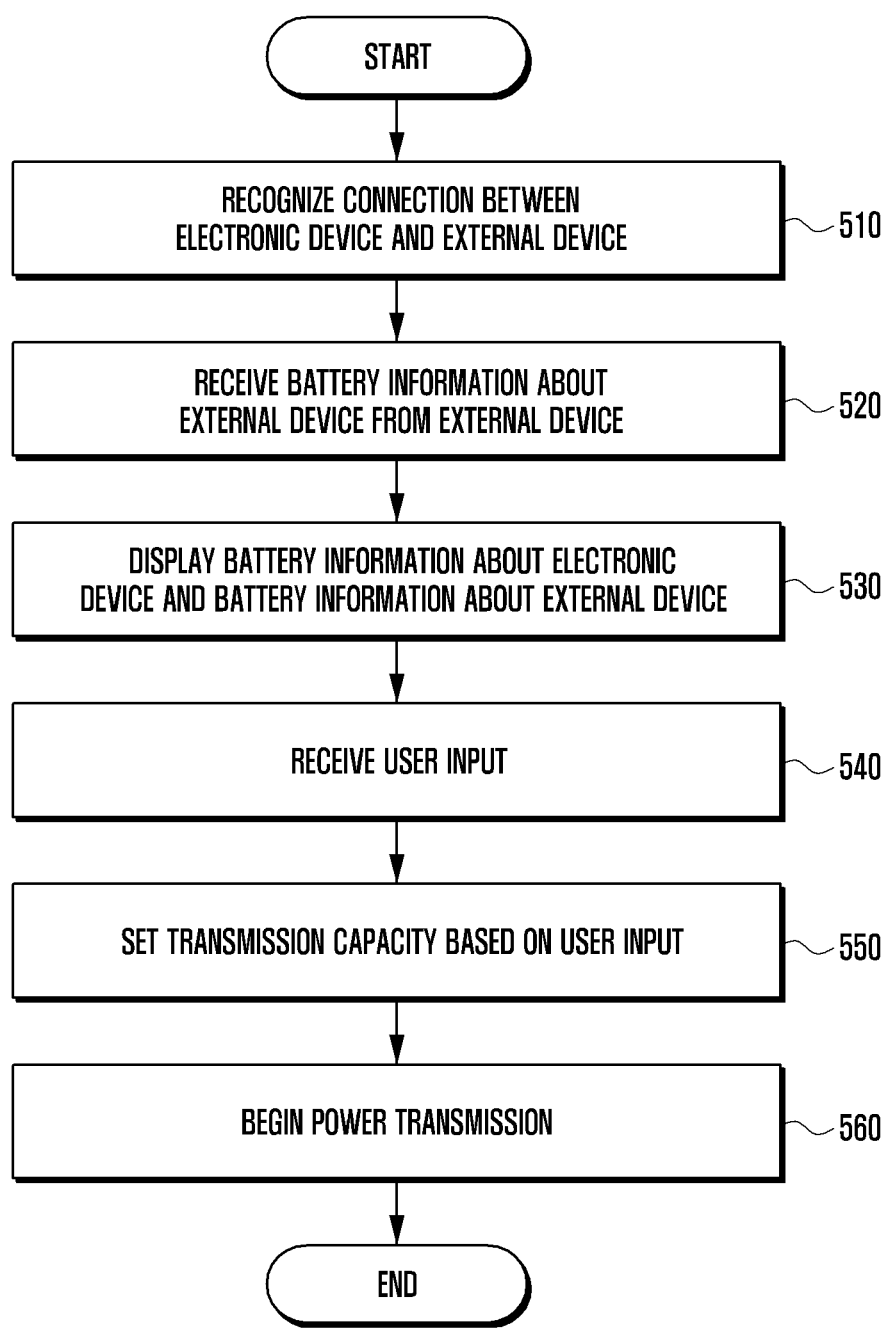
FIG. 5 is a flowchart of an example of a process, according to aspects of the disclosure.

FIG. 5 is a flowchart of an example of a process, according to aspects of the disclosure. In operation 510, a processor of an electronic device (for example, the first electronic device 310) may detect a connection between an external device (for example, the second electronic device 320). For example, the electronic device may detect that the external device is connected through a cable. Additionally or alternatively, the processor of the electronic device may detect that the cable is a power sharing cable (for example, the power sharing cable 330).

In operation 520, the processor of the electronic device may receive battery information from the external device through a wireless communication module (for example, the BT module). In some implementations, operation 520 may include establishing a connection with the external device, transmitting to the external device a message requesting battery information (and/or another type of information, such as memory use status), and receiving from the external device the requested information. For example, the battery information may include a capacity of the battery (for example, mAh), the residual capacity (for example, % and volt (V)) of the battery, and battery usage, and the like. The battery usage may include, for example, battery use rate information for each of system resources (for example, Wi-Fi, a display, and a CPU) of the external device. In addition, the response message may include an identifier corresponding to the external device, a model name of the external device, memory use status information, or the like.

In operation 530, the processor of the electronic device may control the display module so that the display module displays battery information associated with the electronic device and the battery information associated with the external device. In some implementations, operation 530 may include generating power management information (for example, the power management information 312) by using the battery information, and displaying the generated power management information.

In operation 540, the processor of the electronic device may detect a user input (for example, a touch movement input on the screen as illustrated in FIG. 3) from a touch panel.

In operation 550, the processor of the electronic device may calculate an amount of power that is to be transmitted to the external device. In some implementations, the amount of power that is to be transmitted to the external device may be calculated based on a movement distance of the user input. Additionally or alternatively, the processor of the electronic device may generate additional information (for example, the information on the various ratios, the charging time, and the information on the charging direction (for example, the arrow 318) illustrated in FIG. 3) and display this information, as well.

In operation 560, the processor of the electronic device may control an interface to close a circuit between the electronic device and the external device, so that current can begin flowing into the external device.

In operation 560, the processor of the electronic device may display a power transmission status and begin transmitting power to the external electronic device. While power is being transmitted from the electronic device to the external device, the processor of the electronic device may decrement the charging time 316, update the image 313*b* and the ratio 313*c* to indicate that the residual capacity of the battery of the electronic device is decreased, and update the image 314*b* and the ratio 314*c* to indicate that the residual capacity of the battery of the external device is increased. In some implementations, any of the charging time 316, image 313*b*, ratio 313*c*, image 314*b*, and ratio 314*c* may be updated in real-time or near real-time.

In some implementations, the processor of the electronic device may receive a user input requesting the charging to stop. In response to the input, the processor may stop the charging. Furthermore, the processor may restart operation 560 in response to a user input requesting the charging to resume. And still furthermore, the processor may display a notification (for example, notification by using the arrow 318 illustrated in FIG. 3) indicating whether the charging is active or stopped.

Figure 6:
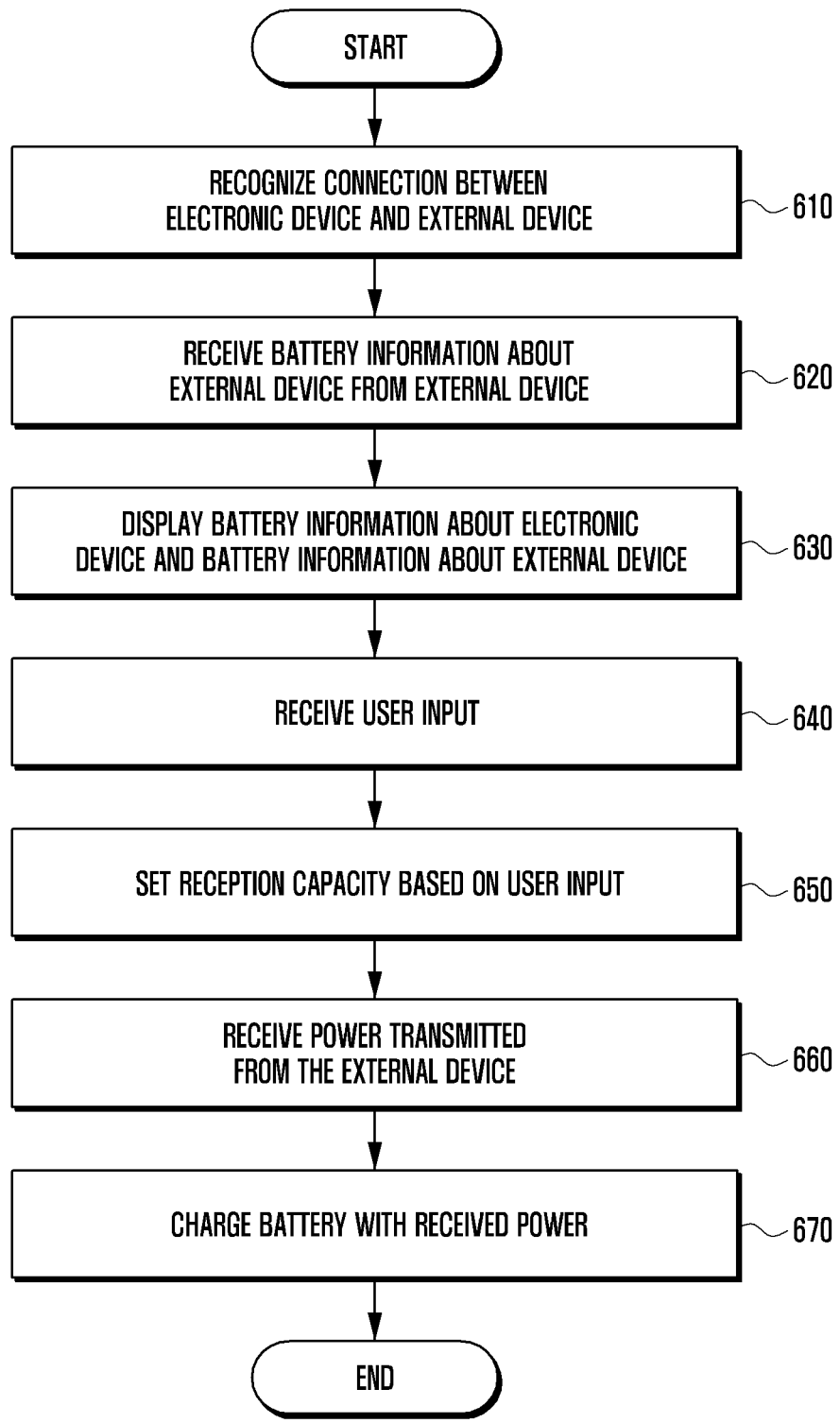
FIG. 6 is a flowchart of an example of a process, according to aspects of the disclosure.

FIG. 6 is a flowchart of an example of a process, according to aspects of the disclosure. In operation 620, a processor of an electronic device (for example, the first electronic device 410) may detect a connection between an external device (for example, the second electronic device 420) and an interface 270 (for example, the USB module 274) in operation 610. Operation 610 may include detecting that the external device is connected through a cable, and detecting that the connected cable is a power sharing cable (for example, the power sharing cable 330).

In operation 620, the processor of the electronic device may receive battery information from the external device through a wireless communication module (for example, the BT module). Operation 620 may include establishing a connection with the external device, transmitting to the external device a message requesting battery information (and/or another type of information, such as memory use status), and receiving the requested information from the external device, in response. For example, the battery information may include a capacity of the battery (for example, mAh), the residual capacity (for example, % and volt (V)) of the battery, and battery usage, and the like. The battery usage may include, for example, battery use rate information for each of system resources (for example, Wi-Fi, a display, and a CPU) of the external device. In addition, the response message may include an identifier corresponding to the external device, a model name of the external device, memory use status information, or the like.

In operation 630, the processor of the electronic device may display battery information associated with the electronic device and battery information associated with the external device. Operation 630 may include generating power management information (for example, the power management information 412) by using the battery information, and displaying the generated power management information.

In operation 640, the processor of the electronic device may detect a user input (for example, a touch movement input on the screen as illustrated in FIG. 4) from a touch panel.

In operation 650, the processor of the electronic device may calculate an amount of power that the electronic device is about to receive from the external device. In some implementations, the amount of power may be calculated based on a movement distance of the user input. In addition, the processor of the electronic device may generate additional information (for example, the information on the various ratios, the charging time, and the information on the charging direction (for example, the arrow 418) illustrated in FIG. 4) and display the additional information, as well.

In operation 660, the processor of the electronic device may display an indication of the residual power of the external device. Operation 660 may include transmitting to the external device a message requesting the external device to begin transmitting power to the electronic device, and receiving the requested power.

In operation 670, the processor (of the electronic device e.g., by using the power management module 170) may charge the battery of the electronic device with the received power.

In some implementations, in operation 670, the processor of the electronic device may update in real-time (or near real-time) an indication of the amount of power received by the electronic device. Additionally or alternatively, in some implementations, the processor of the electronic device may receive a user input requesting the charging to stop. In response to the user input, the processor of the electronic device may transmit to the external device a message requesting the external device to stop transmitting power to the electronic device. Furthermore, the processor may transmit to the external device another message requesting the charging to restart when a user input requesting the charging to restart is detected. And still furthermore, the processor may display a notification (for example, notification by using the arrow 418 illustrated in FIG. 4) indicating whether the charging is active or stopped.

Figure 7:
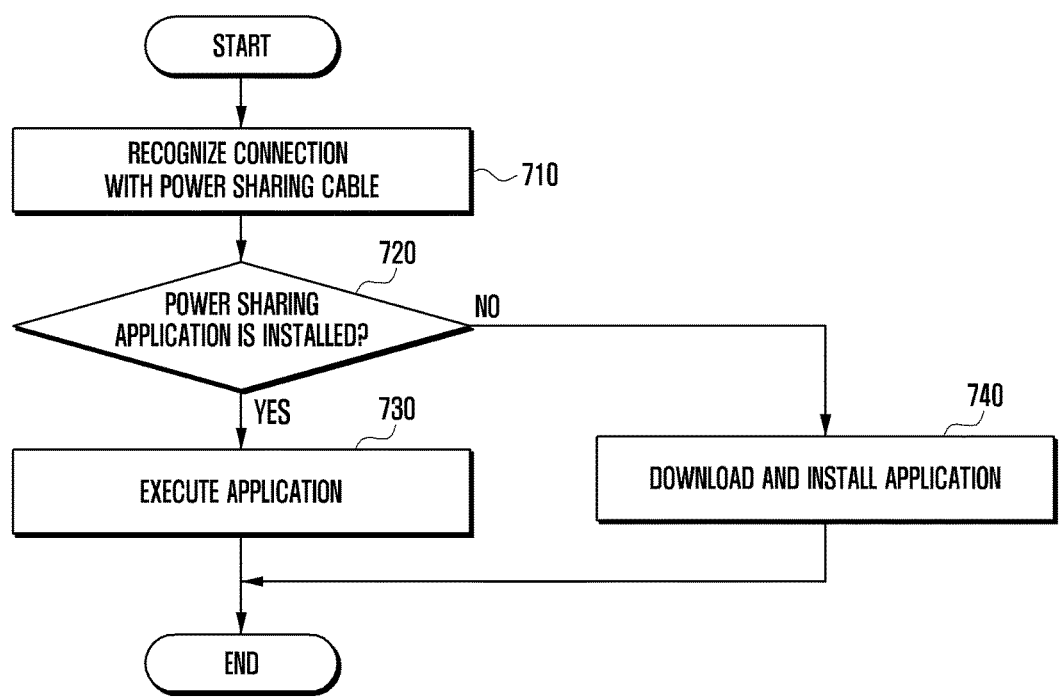
FIG. 7 is a flowchart of an example of a process for installing a power-sharing application, according to aspects of the disclosure.
Figure 8:
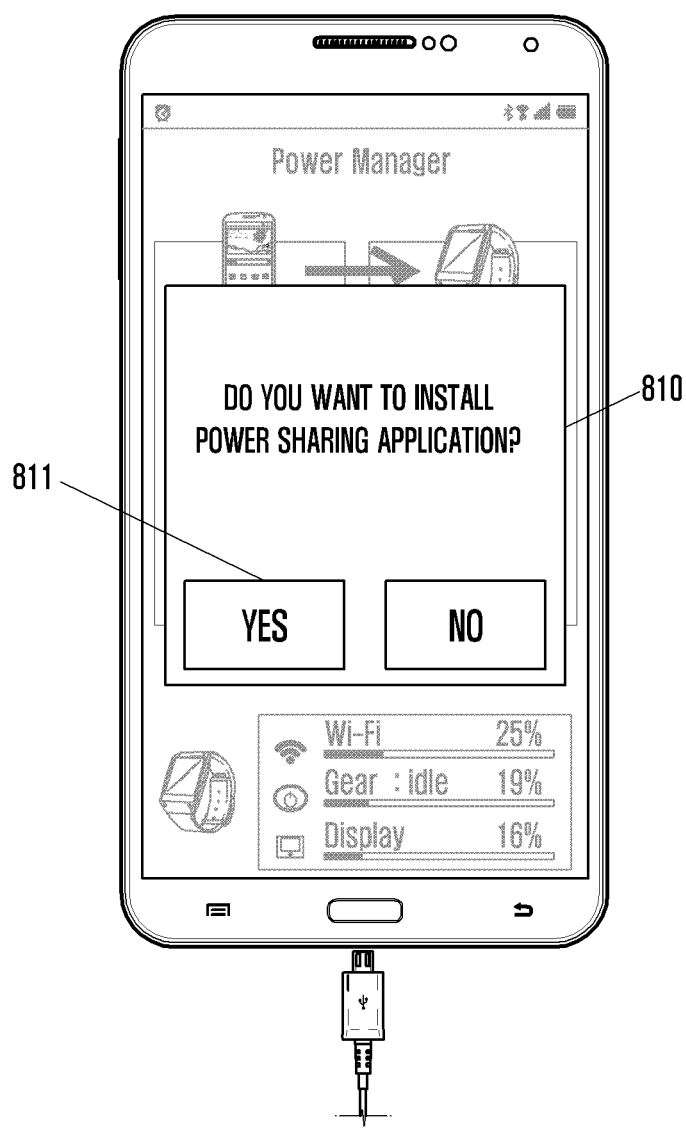
FIG. 8 is a diagram of an example of an interface for installing the power-sharing application, according to aspects of the disclosure.

FIG. 7 is a flowchart of an example of a process for installing a power-sharing application, according to aspects of the disclosure. FIG. 8 is a diagram of a notification window relating to the installation of an application, according to aspects of the disclosure.

In operation 710, a processor of an electronic device (for example, the first electronic device 310 or 410) may recognize that a power sharing cable is connected to the electronic device.

In operation 720, the processor of the electronic device may determine whether a power sharing application (for example, the application making the processor be operated as the UI generating module 172 and the charging time calculating module 173) is installed in the electronic device.

When the power sharing application is installed in the electronic device as a result of the determination in operation 720, the processor may perform, for example, the operations illustrated in FIG. 5 or 6 by executing the application in operation 730.

When the power sharing application is not installed in the electronic device as the result of the determination in operation 720, the processor may download the application through a communication module (for example, the communication module 220) from a server and install the downloaded application in the electronic device in operation 740. Before downloading the application, the processor may control a display module so that the display module displays a notification window 810 for inquiring whether to install the application as illustrated in FIG. 8. As a result of the inquiry, when a user accepts the installation (for example, a user taps YES 811), the processor may perform operation 740.

Figure 9:
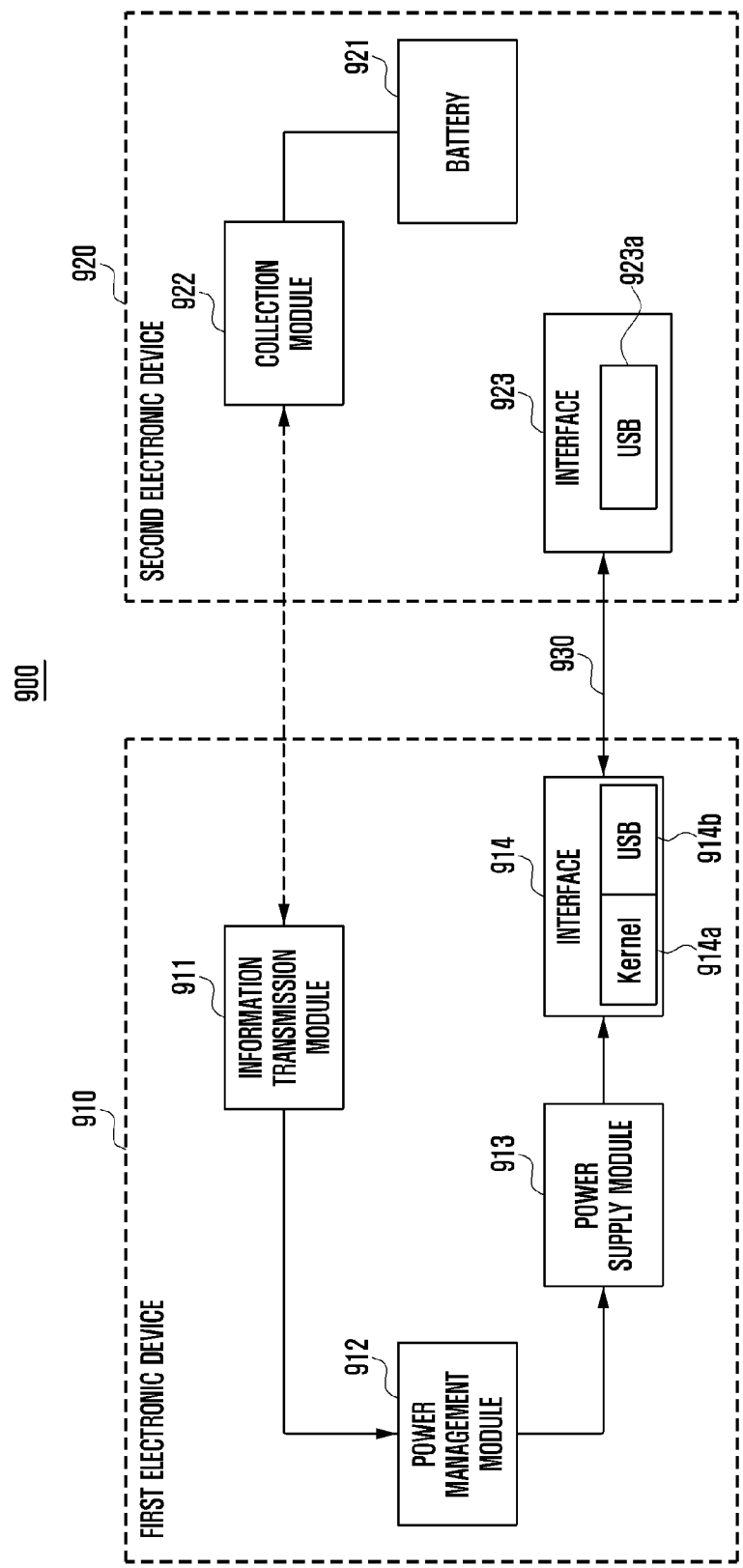
FIG. 9 is a diagram of an example of a unidirectional power sharing system, according to aspects of the disclosure.

FIG. 9 is a diagram of an example of a unidirectional power sharing system, according to aspects of the disclosure.

Referring to FIG. 9, a power sharing system 900 may include a first electronic device 910, a second electronic device 920, and a power sharing cable 930.

The first electronic device 910 may include an information transmission module 911, a power management module 912, a power supplying module 913, and an interface 914. Each of the modules 911-913 may be implemented in software (e.g., using processor-executable instructions), in hardware (e.g., using an electronic circuit), and/or a combination of hardware and software.

The information transmission module 911 may perform an operation for establishing a connection with the second electronic device 920 for data communication, and an operation of receiving battery information and the like from the second electronic device 920 and transmitting the received information to the power management module 912. In order to perform the operations, the information transmission module 913 may include at least one (for example, the BT module 225) among the communication modules 220. Alternately or additionally, the information transmission module 913 may include software for controlling at least one (for example, the BT module 225) among the communication modules 220.

The power management module 912 may perform an operation of controlling power supply to the second electronic device 920. For example, the power management module 912 may include the power management module 170 illustrated in FIG. 1. Alternately or additionally, the power management module 912 may include an application for making a processor (not shown) of the first electronic device 910 be operated at the entire or a part of the power management module 170.

The power supply module 913 may perform an operation of supplying power to the second electronic device 920 or an operation of stopping power supply based on a command (for example, a charging start or a charting stop) of the power management module 912. In order to perform the operations, the power supply module 913 may include the entire or a part of the power management module 295 illustrated in FIG. 2. Alternately or additionally, the power supply module 913 may include software configured so that the processor performs an operation of controlling an interface 914 so that the interface 914 transmits power of the battery of the first electronic device 910 to the second electronic device 920, and an operation of controlling the interface 914 so that the interface 914 stops the power supply.

The interface 914 may be connected to the second electronic device 920 through the power sharing cable 930, and perform an operation of transmitting the power of the battery to the second electronic device 920. In order to perform the operation, the interface 914 may include a USB 914b (for example, a USB module 274) and a kernel 914a (for example, the kernel 131) for controlling the USB 914b.

The second electronic device 920 may include a battery 921, a collection module 922, and an interface 923. Each of the modules 921-923 may be implemented in software (e.g., using processor-executable instructions), in hardware (e.g., using an electronic circuit), and/or a combination of hardware and software.

The collection module 922 may perform an operation of establishing a connection with the first electronic device 920 for data communication, an operation of collecting information about a battery 921, and an operation of transmitting the collected information on the battery to the first electronic device 910. In order to perform the operations, the collection module 922 may include at least one (for example, the BT module 225) among the communication modules 220. Alternately or additionally, the information transmission module 913 may include software configured so that the processor collects the battery information, and transmits the battery information through at least one (for example, the BT module 225) among the communication modules 220 to the first electronic device 910. The interface 923 may perform an operation of connecting the first electronic device 910 through the power sharing cable 930, receiving power from the first electronic device 910, and transmitting the received power to the power management module (for example, the power management module 295). In order to perform the operation, the interface 923 may include a USB 923a (for example, the USB module 274).

FIGS. 1-9 are provided as an example only. At least some of the steps discussed with respect to these figures can be performed concurrently, performed in a different order, and/or altogether omitted. It will be understood that the provision of the examples described herein, as well as clauses phrased as "such as," "e.g.", "including", "in some aspects," "in some implementations," and the like should not be interpreted as limiting the claimed subject matter to the specific examples.

The above-described aspects of the present disclosure can be implemented in hardware, firmware or via the execution of software or computer code that can be stored in a recording medium such as a CD-ROM, a Digital Versatile Disc (DVD), a magnetic tape, a RAM, a floppy disk, a hard disk, or a magneto-optical disk or computer code downloaded over a network originally stored on a remote recording medium or a non-transitory machine-readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for".

While the present disclosure has been particularly shown and described with reference to the examples provided therein, it will be understood by those skilled in the art that various changes in form and details may be made therein without departing from the spirit and scope of the present disclosure as defined by the appended claims.

What is claimed is:

1. A method comprising:
   detecting a resistance value of an electrical connection between a first device having a first battery and a second device having a second battery;
   receiving an indication of a residual power of the second battery;
   in response to the detection of the resistance value, displaying, by the first device, a power sharing interface based on the indication of the residual power of the second battery;
   detecting an input to the interface specifying an amount of power for transmission;
   calculating an increased capacity of the second battery based on a sum of the residual power and the specified amount of power for transmission for display in the power sharing interface; and
   transmitting the specified amount of power from the first battery to the second device.

2. The method of claim 1, wherein the power sharing interface includes an indication of charging direction that indicates whether the first device is a recipient of power or a provider of power.

3. The method of claim 1, wherein the power sharing interface includes:
   a first input element associated with the first battery which when activated causes the specified amount of power for transmission to be changed; and
   a second input element associated with the second battery which when activated causes the specified amount of power for transmission to be changed.

4. The method of claim 1, wherein the power sharing interface identifies a plurality of hardware components of the second device along with a respective power consumption of each of the hardware components.

5. A method comprising:
   detecting a resistance value of an electrical connection between a first device having a first battery and a second device having a second battery;
   receiving an indication of a residual power of the second battery;
   in response to the detection of the resistance value, displaying, by the first device, a power sharing interface based on the indication of the residual power of the second battery;
   detecting an input to the interface specifying an amount of power for transmission;
   calculating an increased capacity of the first battery based on a sum of a residual power of the first battery and the specified amount of power for transmission for display in the power sharing interface; and
   receiving the specified amount of power from the second battery.

6. The method of claim 5, further comprising, in response to detecting that the specified amount of power is transmitted, transmitting to the second device a request to stop transmitting power to the first device.

7. The method of claim 5, wherein the power sharing interface includes an indication of charging direction that indicates whether the first device is a recipient of power or a provider of power.

8. The method of claim 5, wherein the power sharing interface includes:
   a first input element associated with the first battery which when activated causes the specified amount of power for transmission to be changed; and
   a second input element associated with the second battery which when activated causes the specified amount of power for transmission to be changed.

9. The method of claim 5, wherein the power sharing interface identifies a plurality of hardware components of the second device along with a respective power consumption of each of the hardware components.

10. An electronic device comprising a processor configured to:
    detect a resistance value of an electrical connection between the electronic device having a first battery and a second device having a second battery;
    receive an indication of a residual power of the second battery;

in response to the detection of the resistance value, display, by the electronic device, a power sharing interface based on the indication of the residual power of the second battery;
detect an input to the interface specifying an amount of power for transmission;
calculate an increased capacity of the second battery based on a sum of the residual power and the specified amount of power for transmission for display in the power sharing interface; and
transmit the specified amount of power from the first battery to the second device.

11. The electronic device of claim 10, wherein the power sharing interface includes an indication of charging direction that indicates whether the electronic device is a recipient of power or a provider of power.

12. The electronic device of claim 10, wherein the power sharing interface includes:
a first input element associated with the first battery which when activated causes the specified amount of power for transmission to be changed; and
a second input element associated with the second battery which when activated causes the specified amount of power for transmission to be changed.

13. The electronic device of claim 10, wherein the power sharing interface identifies a plurality of hardware components of the second device along with a respective power consumption of each of the hardware components.

14. An electronic device comprising a processor configured to:
detect a resistance value of an electrical connection between the electronic device having a first battery and a second device having a second battery;
receive an indication of a residual power of the second battery;
in response to the detection of the resistance value, display, by the electronic device, a power sharing interface based on the indication of the residual power of the second battery;
detect an input to the interface specifying an amount of power for transmission;
calculate an increased capacity of the first battery based on a sum of a residual power of the first battery and the specified amount of power for transmission for display in the power sharing interface; and
receive the specified amount of power from the second battery.

15. The electronic device of claim 14, wherein the processor is further configured to, in response to detecting that the specified amount of power is transmitted, transmitting to the second device a request to stop transmitting power to the electronic device.

16. The electronic device of claim 14, wherein the power sharing interface includes an indication of charging direction that indicates whether the electronic device is a recipient of power or a provider of power.

17. The electronic device of claim 14, wherein the power sharing interface includes:
a first input element associated with the first battery which when activated causes the specified amount of power for transmission to be changed; and
a second input element associated with the second battery which when activated causes the specified amount of power for transmission to be changed.

18. The electronic device of claim 14, wherein the power sharing interface identifies a plurality of hardware components of the second device along with a respective power consumption of each of the hardware components.

* * * * *